US009764583B2

(12) United States Patent
Lou et al.

(10) Patent No.: US 9,764,583 B2
(45) Date of Patent: Sep. 19, 2017

(54) METHOD TO TRANSFORM A VIRTUAL OBJECT INTO A REAL PHYSICAL OBJECT

(75) Inventors: Zhe Lou, Mortsel (BE); Sigurd Van Broeck, Zoersel (BE); Marc Van Den Broeck, Sint-Katelijne-Waver (BE)

(73) Assignee: Alcatel Lucent, Boulogne-Billancourt (FR)

( * ) Notice: Subject to any disclaimer, the term of this patent is extended or adjusted under 35 U.S.C. 154(b) by 612 days.

(21) Appl. No.: 13/637,452

(22) PCT Filed: Mar. 8, 2011

(86) PCT No.: PCT/EP2011/053486

§ 371 (c)(1), (2), (4) Date: Sep. 26, 2012

(87) PCT Pub. No.: WO2011/117070

PCT Pub. Date: Sep. 29, 2011

(65) Prior Publication Data

US 2013/0016379 A1 Jan. 17, 2013

(30) Foreign Application Priority Data

Mar. 26, 2010 (EP) .................................... 10305312

(51) Int. Cl.
*G06T 15/04* (2011.01)
*B42D 15/00* (2006.01)

(52) U.S. Cl.
CPC .................................... *B42D 15/00* (2013.01)

(58) Field of Classification Search
CPC ......... G06F 17/00; G06T 15/00; G06T 17/00; G06T 2207/10028; G06T 11/001;
(Continued)

(56) References Cited

U.S. PATENT DOCUMENTS 5,586,659 A 12/1996 Trumbo
2005/0236464 A1 10/2005 Cohen
(Continued)

FOREIGN PATENT DOCUMENTS

GB 2 241 470 A 9/1991
GB 2 333 286 A 7/1999
(Continued)

OTHER PUBLICATIONS

Gregor Broll et al, Authoring Support for Mobile Interaction with the Real World, May 2007, Pervasive 2007 Late Breaking Result and Poster, Toronto, Ontario, Canada, pp. 1-4.*
(Continued)

*Primary Examiner* — Jamares Q Washington
(74) *Attorney, Agent, or Firm* — Fay Sharpe, LLP

(57) ABSTRACT

A method to create a coarse-grained real physical object (RO) from a fine-grained 3D virtual object (VO). The method comprises the steps of selecting (RTVO) the virtual object, e.g. a character, or at least elements thereof (head, chest, arms, legs) in a virtual environment (VE), creating (CRBB) a bounding box for each element wherein the element fits, creating (CRTC) a texture cloud for each bounding box by taking a 360 degree snapshot of the element as delimited by its bounding box, applying (APIS) image stitching technology on the texture cloud for obtaining a distinct texture for each bounding box, printing (PRBB) the bounding boxes with their associated texture, and stitching the bounding boxes together. The printing step may occur on a paper printer whereby a cut-and-glue real physical object (RO) can be obtained, or directly on a 3D printer. The method is possibly completed by encrypting the real object with semipedia technology, thereby bringing the real object into the virtual environment (VE) and allowing a user can to use the real object for controlling its corresponding virtual object (VO).

11 Claims, 2 Drawing Sheets

(58) Field of Classification Search
CPC .. G06T 15/04; G06K 2209/40; G03G 15/224; G03F 7/70416; H04N 1/00827; A61B 2019/5295
USPC ............... 358/1.9, 1.3, 2.1, 3.24, 1.13, 1.18; 345/653, 664, 679; 382/154, 285; 700/98
See application file for complete search history.

(56) References Cited

U.S. PATENT DOCUMENTS

| | | | | |
|---|---|---|---|---|
| 2006/0212150 | A1* | 9/2006 | Sims | 700/98 |
| 2007/0069001 | A1* | 3/2007 | Crum et al. | 229/116.1 |
| 2008/0015727 | A1* | 1/2008 | Dunne et al. | 700/118 |
| 2011/0087350 | A1* | 4/2011 | Fogel | G06F 17/50<br>700/98 |

FOREIGN PATENT DOCUMENTS

| | | | |
|---|---|---|---|
| JP | 11-34425 | A | 2/1999 |
| JP | 2003-51026 | A | 2/2003 |
| JP | 2009-48305 | A | 3/2009 |
| WO | WO 2009/043677 | A1 | 4/2009 |

OTHER PUBLICATIONS

International Search Report for PCT/EP2011/053486 dated Jun. 22, 2011.

* cited by examiner

METHOD TO TRANSFORM A VIRTUAL OBJECT INTO A REAL PHYSICAL OBJECT

The present invention relates to a method to create a real physical object.

Companies such as Cubeecraft™ or Lego™ provide paper or plastic models representing a character or another figure that can printed so that a real physical object representing the figure can be created, e.g. by a cut-and-glue operation on the paper model.

Manufacturing companies produce and sell hand-drafted Cubeecraft™-models look-alike figures, e.g., that have been seen in a popular movie or superstars, in order to associate the paper model with a media experience. The real physical object created from the figure allows associating a virtual experience in a virtual environment with a real life experience.

However, there is currently no method or system adapted to automatically generate a real physical object from a virtual object, e.g. from a figure seen in a movie or in a game.

An object of the present invention is to provide a method to transform a virtual object into a real physical object in order to bring the virtual object into the real world.

According to an embodiment of the invention, this object is achieved owing to the fact that said method comprises the steps of selecting a virtual object in a virtual environment, creating a bounding box wherein said virtual object fits, creating a texture cloud by taking a 360 degree snapshot of said virtual object as delimited by said bounding box, applying image stitching technology on said texture cloud for obtaining a texture for said bounding box, and printing said bounding box with said texture.

This embodiment allows producing a design, e.g. a Cubeecraft™-model, from the selected object in the virtual world, and creating a physical object in the real world from this design.

In a preferred characterizing embodiment of the present invention, said virtual object comprises a plurality of elements, and said method comprises the steps of selecting individually each element of said virtual object in the virtual environment, creating a distinct bounding box for each element and wherein the element associated to the bounding box fits, creating a texture cloud for each bounding box by taking a 360 degree snapshot of the associated element as delimited by said bounding box, applying image stitching technology on said texture cloud for obtaining a distinct texture for each bounding box, printing the bounding boxes with their associated texture, and stitching the bounding boxes together.

In this way, a real physical object may for instance be a character that can be created based on a virtual object such as a virtual character of which the elements are head, chest, arms and legs.

Another characterizing embodiment of the present invention is that said virtual object is a fine-grained 3D object of a virtual environment, and that said real physical object is a coarse-grained 3D object of the real world.

In other words, this embodiment of the method allows transforming a fine-grained 3D object, e.g. a figure or an avatar, from a virtual world into coarse-grained real object, and thereby associate user's virtual experience with his real live.

Also another characterizing embodiment of the present invention is that the bounding box can be printed on a standard paper printer or on a 3D printer.

Printing on 3D printed allows obtaining immediately the object or character in the real world avoiding so the cut-and-glue operation.

Further characterizing embodiments of the present method are mentioned in the appended claims.

It is to be noticed that the terms "comprising" or "including", used in the claims, should not be interpreted as being restricted to the means listed thereafter. Thus, the scope of an expression such as "a device comprising means A and B" should not be limited to an embodiment of a device consisting only of the means A and B. It means that, with respect to embodiments of the present invention, A and B are essential means of the device.

Similarly, it is to be noticed that the term "coupled", also used in the claims, should not be interpreted as being restricted to direct connections only. Thus, the scope of the expression such as "a device A coupled to a device B" should not be limited to embodiments of a device wherein an output of device A is directly connected to an input of device B. It means that there may exist a path between an output of A and an input of B, which path may include other devices or means.

The above and other objects and features of the invention will become more apparent and the invention itself will be best understood by referring to the following description of an embodiment taken in conjunction with the accompanying drawings wherein.

Figure 1:
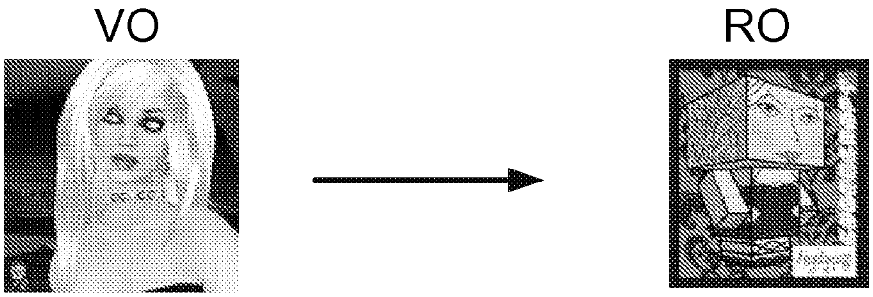
FIG. 1 represents a method to transform a virtual object (VO) into a real physical object RO according to embodiments of the present invention.

The basic idea of the present invention is to provide a method for transforming a fine-grained 3D virtual object, such as an avatar or a figure VO as shown at FIG. 1, from a virtual world into a coarse-grained real physical 3D object RO. This brings the virtual object VO into the real world and allows a user to associate his virtual experience with his real live.

Figure 2:
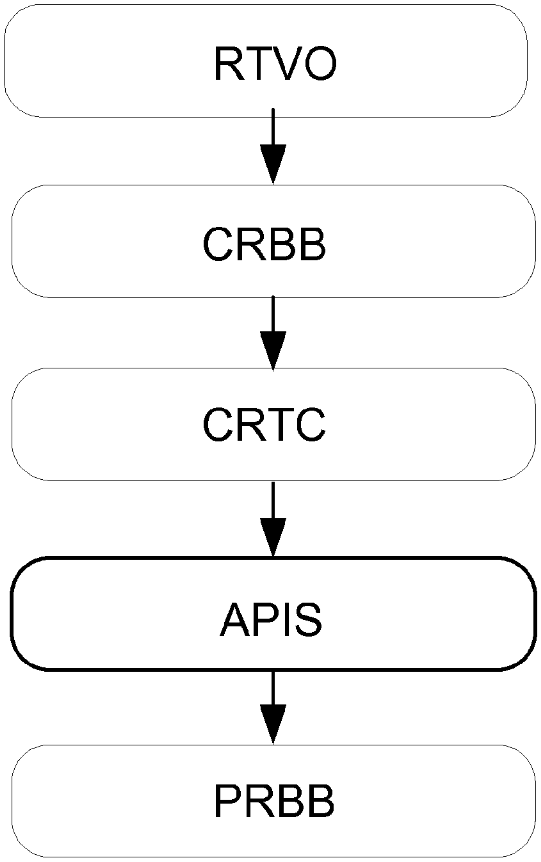
FIG. 2 shows examples of steps of a method according to the invention.
Figure 3:
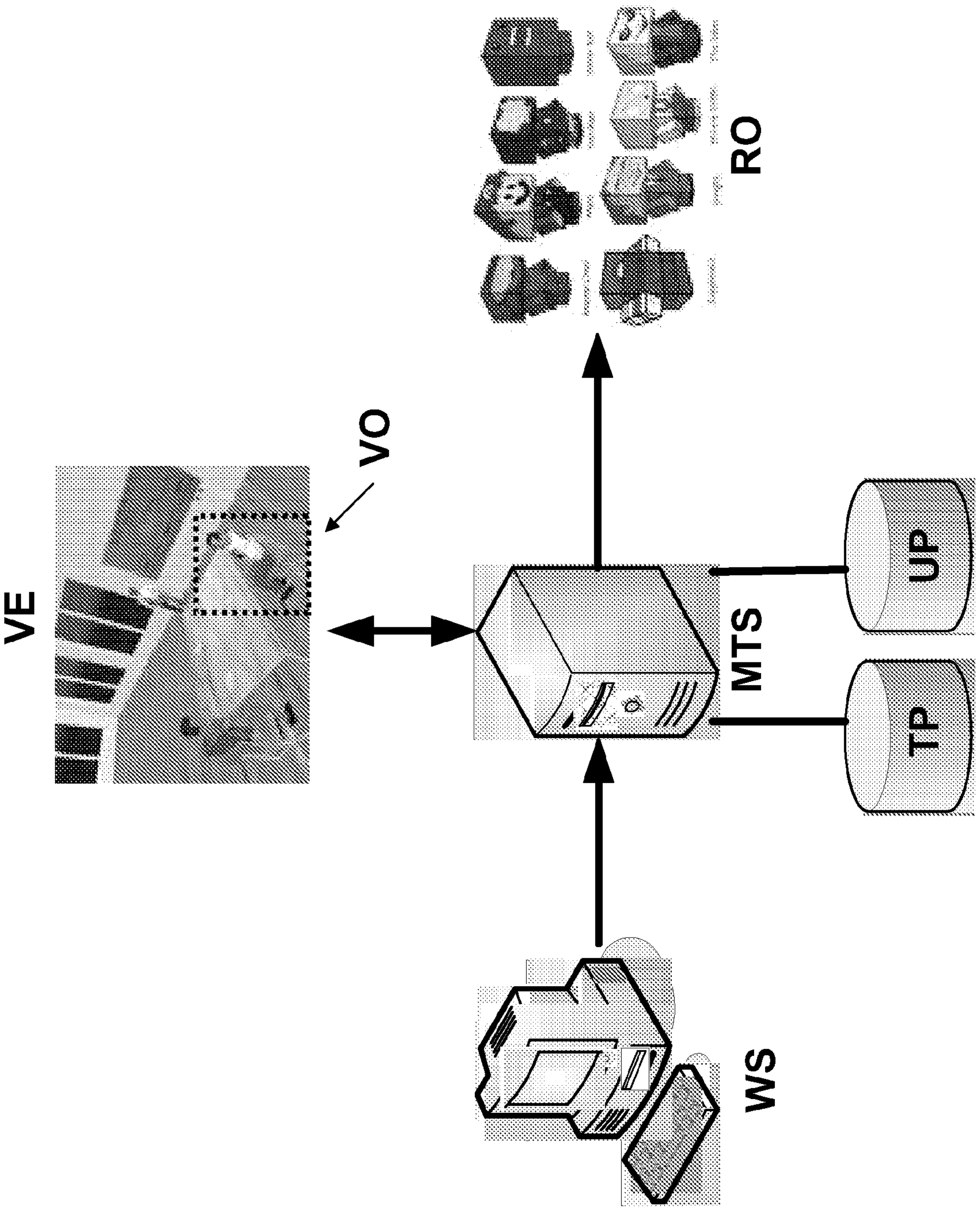
FIG. 3 shows apparatus used to achieve steps of the present method.

A first step of an embodiment of the method is to retrieve RTVO a virtual object VO from a virtual environment VE, by referring to the FIGS. 2 and 3.

Once the virtual object VO is available, a second step is to create CRBB a bounding box wherein the virtual object exactly fits. Bounding box is a terminology used in 3D modeling for a cube wherein a model or object can exactly fit. In a variant embodiment, a distinct bounding box is created for each element of the selected virtual object. For instance, if the virtual object VO is a character, elements may be parts of its body such as head, chest, arms and legs. A bounding box is then created and associated to each of these elements.

The next step is to create CRTC a texture cloud for each bounding box by taking snapshot from 360 degrees of the virtual object VO, or of each element thereof, as delimited by the dimensions of the associated bounding box. For instance, a virtual camera can be moved around a head to take many snapshots of the head. The pictures so taken should contain enough overlapping in order to create a 360-degree view.

The following step is to apply APIS image stitching technology on the texture cloud for obtaining a texture for the bounding box. Image stitching technology consists in seamlessly stitch multiple snapshots together into one seamless, contiguous image. As a result, by applying image-stitching technology, the snapshots can be combined into one 360-degree view image that can be used as texture for the bounding box.

After this step, the bounding box with its texture can be printed PRBB. In case the printer is a 3D printer, a real 3D physical object RO is immediately available to be used in the real world. In case of a paper printer, a final cut-and-glue step may be necessary for obtaining the 3D paper model.

If several elements are printed separately, the desired model, e.g. a Cubeecraft™-model or a Lego™-model, is obtained by stitching all the corresponding bounding boxes (head, chest, arms, legs, etc.) together and adapting it into the desired model.

FIG. 3 shows a system adapted to perform steps of embodiments of the above method. This system comprises a client application running in a client machine WS, a virtual environment VE, a Model Transformation Service MTS with attached user profiles UP and templates TP.

The model transformation service MTS is responsible for 1. selecting (RTVO) a virtual object VO in a virtual environment, 2. creating (CRBB) a bounding box wherein the virtual object VO fits, 3. creating (CRTC) a texture cloud by taking a 360 degree snapshot of the virtual object VO as delimited by the bounding box, 4. applying (APIS) image stitching technology on the texture cloud for obtaining a texture for the bounding box, and 5. printing (PRBB) the bounding box with the texture.

6. possibly encrypting the cut-and-glue real object RO with semipedia technology. The semipedia technology allows bringing information from the physical world to the virtual environment VE. As a result, the user can use the real object RO to control its corresponding virtual object VO.

When a user puts the 3D paper object RO in front of a camera, a client application detects the semipedia on the 3D paper object RO and shows the corresponding virtual object VO in the virtual environment VE. In this way, the user can for instance rotate the virtual object VO in the virtual environment VE by rotating the 3D real paper object RO.

It is to be noted that the semipedia technology can be replaced by RFID technology, Barcode technology or any other identification technologies.

It is further to be noted that Cubeecraft™ and Lego™-models are just cited herein as two possible examples of output means. Other alternatives, e.g. of 3D printer, can be plugged into the system as well.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method to create a real physical object (RO), wherein said method comprises:

selecting (RTVO) a virtual object (VO) in a virtual environment;

creating (CRBB) a bounding box wherein said virtual object fits;

creating (CRTC) a texture cloud by taking a 360 degree snapshot of said virtual object as delimited by said bounding box;

applying (APIS) image stitching technology on said texture cloud for obtaining a texture for said bounding box; and printing (PRBB) said bounding box with said texture.

2. The method according to claim 1, wherein said virtual object (VO) comprises a plurality of elements;

and in that said method comprises:

selecting individually each element of said virtual object in the virtual environment;

creating a distinct bounding box for each element and wherein the element associated to the bounding box fits;

creating a texture cloud for each bounding box by taking a 360 degree snapshot of the associated element as delimited by said bounding box;

applying image stitching technology on said texture cloud for obtaining a distinct texture for each bounding box;

printing the bounding boxes with their associated texture; and stitching the bounding boxes together.

3. The method according to claim 1, wherein said virtual object (VO) is a 3D object of a virtual environment;

and in that said real physical object (RO) is a 3D object of the real world.

4. The method according to claim 3, wherein said virtual object (VO) is a fine-grained 3D object;

and in that said real physical object (RO) is a coarse-grained object.

5. The method according to claim 1, wherein the bounding box is printed on paper.

6. The method according to claim 1, wherein the bounding box is printed on a 3D printer.

7. The method according to claim 2, wherein said virtual object (VO) is a character of a virtual world.

8. The method according to claim 7, wherein the elements of said virtual object (VO) are parts of said character.

9. The method according to claim 1, wherein selecting (RTVO) comprises an operation of retrieving a copy of said virtual object (VO) and of a virtual identification of said virtual object from said virtual environment (VE).

10. The method according to claim 2, wherein selecting comprises an operation of retrieving a copy of said element of said virtual object (VO) and of a virtual identification of said element from said virtual environment (VE).

11. The method according to claim 1, wherein said method includes encrypting said real object (RO) with semipedia technology.

* * * * *